(12) United States Patent
Rysgaard et al.

(10) Patent No.: US 12,144,021 B1
(45) Date of Patent: Nov. 12, 2024

(54) USER EQUIPMENT COMPRISING RADIO SUB-SYSTEMS (IN-DEVICE CO-EXISTENCE)

(71) Applicant: Nokia Technologies Oy, Espoo (FI)

(72) Inventors: Bent Henneberg Rysgaard, Aalborg (DK); Poul Olesen, Støvring (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/659,126

(22) Filed: May 9, 2024

(30) Foreign Application Priority Data

May 12, 2023 (FI) ..................................... 20235539

(51) Int. Cl.
*H04W 74/04* (2009.01)
*H04W 16/14* (2009.01)
*H04W 74/08* (2024.01)

(52) U.S. Cl.
CPC ........... *H04W 74/04* (2013.01); *H04W 16/14* (2013.01); *H04W 74/0866* (2013.01)

(58) Field of Classification Search
CPC .. H04W 74/04; H04W 16/14; H04W 74/0866
See application file for complete search history.

(56) References Cited

U.S. PATENT DOCUMENTS

| | | |
|---|---|---|
| 2014/0050134 A1 | 2/2014 | Ahn et al. |
| 2021/0243753 A1 | 8/2021 | Kim et al. |
| 2022/0329279 A1 | 10/2022 | Mukherjee et al. |

FOREIGN PATENT DOCUMENTS

| | | | | |
|---|---|---|---|---|
| WO | WO-2014123356 A1 | * | 8/2014 | ........ H04W 72/0453 |
| WO | 2022084926 A1 | | 4/2022 | |

OTHER PUBLICATIONS

ZTE Corporation et al. R2-2303884. 37.340 running CR for introduction of IDC. 3GPP TSG-RAN WG2 Meeting #121bis, Electronic, Apr. 18-26, 2023: [online], Apr. 7, 2023, [retrieved on Ocrt. 17, 2023]. Retrieved from <https://www.3gpp.org/ftp/tsg_ran/WG2_RL2/TSGR2_121bis-e/Docs/R2-2303884.zip>, the whole document, in particular, Sections 7.10, 13.1, Annex.

(Continued)

*Primary Examiner* — Mohammad S Anwar
(74) *Attorney, Agent, or Firm* — Robert P. Michal, Esq.; Carter, DeLuca & Farrell LLP (57) ABSTRACT

A user equipment including a first radio sub-system configured to use a first radio access technology; a second radio sub-system configured to use a second radio access technology different to the first radio access technology; a data interface configured for transfer of parameters between the first radio sub-system and the second radio sub-system; wherein the a first radio sub-system is configured to send in-device co-existence relevant parameters to second radio sub-system, wherein the in-device co-existence parameter at least indicates a radio resource, in a frequency domain and/or a time domain.

1 Claim, 4 Drawing Sheets

(56) References Cited

OTHER PUBLICATIONS

3GPP TR 36.816 V11.2.0 (2011-12). 3rd Generation Partnership Project; Technical Specification Group Radio Access Network; Evolved Universal Terrestrial Radio Access (E-UTRA); Study on signalling and procedure for interference avoidance for in-device coexistence (Release 11). [online], Dec. 22, 2011, [retrieved on Oct. 17, 2023]. Retrieved from <https://www.3gpp.org/ftp/Specs/archive/36_series/36.816/36816-b20.zip>, the whole document, in particular, Figs. 4-1, 4-2, 4-1.1; Section 4.
Nokia et al. R2-2306365. Interference direction for TDM Assistance Information for IDC. 3GPP TSG-RAN WG2 Meeting #122, Incheon, South Korea, May 22-26, 2023: [online], May 12, 2023, [retrieved on Oct. 16, 2023]. Retrieved from <https://www.3gpp.org/ftp/tsg_ran/WG2_RL2/TSGR2_122/Docs/R2-2306365.zip>.
Finnish Office Action issued by the Finnish Patent and Registration Office in relation to Finnish Application No. 20235539 dated Oct. 19, 2023 (13 pages).
Finnish Search Report issued by the Finnish Patent and Registration Office in relation to Finnish Application No. 20235539 dated Oct. 19, 2023 (2 pages).
Communication of Acceptance issued by the Finnish Patent and Registration Office in relation to Finnish Application No. 20235539 dated Mar. 11, 2024 (12 pages).

\* cited by examiner

USER EQUIPMENT COMPRISING RADIO SUB-SYSTEMS (IN-DEVICE CO-EXISTENCE)

CROSS-REFERENCE TO RELATED APPLICATIONS

This application is claims priority to Finnish Patent Application No. 20235539, filed May 12, 2023, the disclosure of this application is expressly incorporated herein by reference in its entirety.

TECHNOLOGICAL FIELD

Examples of the disclosure relate to user equipment comprising radio sub-systems.

BACKGROUND

A user equipment can comprise multiple radio sub-systems configured to use a different radio access technology. There is a possibility of radio interference between the different radio sub-systems.

A first radio sub-system and a second radio sub-system can be configured to manage interference independently by making their own measurements.

It would be desirable to improve management of radio interference.

BRIEF SUMMARY

Co-ordination between a first radio sub-system and a second radio sub-system can enable dependent management of interference where information relating to one radio sub-system is shared with the other radio sub-system to enable avoidance of radio interference.

According to various, but not necessarily all, examples there is provided examples as claimed in the appended claims.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Similar reference numerals are used in the figures to designate similar features. For clarity, all reference numerals are not necessarily displayed in all figures.

In the following description a class (or set) can be referenced using a reference number without a subscript index (e.g. 10) and a specific instance of the class (member of the set) can be referenced using the reference number with a numerical type subscript index (e.g. 10_1) and a non-specific instance of the class (member of the set) can be referenced using the reference number with a variable type subscript index (e.g. 10_i).

DETAILED DESCRIPTION

The following disclosure relates to user equipment 110 comprising:
- a first radio sub-system 10 configured to use a first radio access technology;
- a second radio sub-system 20 configured to use a second radio access technology different to the first radio access technology;
- a data interface 30 configured for transfer of parameters between the first radio sub-system 10 and the second radio sub-system 20;
- wherein the user equipment 110 is configured to transfer an in-device co-existence relevant parameter 40 between the first radio sub-system 10 and the second radio sub-system 20 to enable co-operation between the first radio sub-system 10 and the second radio sub-system 20 that avoids or reduces interference between the first radio sub-system 10 and the second radio sub-system 20.

The first radio sub-system 10 and the second radio sub-system 20 operate independently. However, the transferred in-device co-existence parameter 40 allows informed allocation of resources independently for each sub-system that mitigates interference between the first radio sub-system 10 and the second radio sub-system 20.

The user equipment 110 is configured to transfer an in-device co-existence relevant parameter 40_1 from the first radio sub-system 10 to the second radio sub-system 20 to enable co-operation between the first radio sub-system 10 and the second radio sub-system 20 that avoids or reduces interference between the first radio sub-system 10 and the second radio sub-system 20.

In at least some examples, the transferred in-device co-existence parameter 40_1 at least indicates a radio resource and the second radio sub-system 20 is configured to enable, in dependence upon the transferred in-device co-existence parameter 40_1, co-operation between the first radio sub-system 10 and the second radio sub-system 20 that avoids or reduces interference between the first radio sub-system 10 and the second radio sub-system 20

In at least some examples, the transferred in-device co-existence parameter 40_1 at least indicates a radio resource and the second radio sub-system 20 is configured to control its use of radio resources in dependence upon the transferred in-device co-existence parameter 40_1. The transferred in-device co-existence parameter 40_1 allows the second radio sub-system 20 to allocate resources that mitigate interference between the first radio sub-system 10 and the second radio sub-system 20.

The second radio sub-system 20, however, operates independently of the first radio sub-system 10 and is not under command and control of the first radio sub-system 10.

However, the information comprised in the transferred in-device co-existence parameter 40_1 is used in an independent decision making process at the second radio sub-system 20. The second radio sub-system 20 is thus configured to control its use of radio resources in dependence upon the transferred in-device co-existence parameter 40_1.

In at some but not necessarily all examples, the user equipment 110 is configured to exchange in-device co-existence parameters 40_1, 40_2.

The transfer of an in-device co-existence parameter 40 can be unidirectional. The transfer of an in-device co-existence parameter 40 or in-device co-existence parameters 40 can be bi-directional. Bi-directional exchange can be performed as two independent unidirectional transfers or as contemporaneous unidirectional transfers that exchange contemporaneous information.

In at least some but not necessarily all examples, the user equipment 110 is additionally configured to transfer an in-device co-existence relevant parameter 40_2 to the first radio sub-system 10 from the second radio sub-system 20 to enable co-operation between the first radio sub-system 10 and the second radio sub-system 20 that avoids or reduces interference between the first radio sub-system 10 and the second radio sub-system 20.

In at least some examples, the transferred in-device co-existence parameter 40_2 at least indicates a radio resource and the first radio sub-system 10 is configured to enable, in dependence upon the transferred in-device co-existence parameter 40_2, co-operation between the first radio sub-system 10 and the second radio sub-system 20 that avoids or reduces interference between the first radio sub-system 10 and the second radio sub-system 20.

In at least some examples, the transferred in-device co-existence parameter 40_2 at least indicates a radio resource and the first radio sub-system 10 is configured to control its use of radio resources in dependence upon the transferred in-device co-existence parameter 40_2. The transferred in-device co-existence parameter 40_2 allows the first radio sub-system 10 to allocate resources that mitigate interference between the first radio sub-system 10 and the second radio sub-system 20.

The first radio sub-system 10, however, operates independently of the second radio sub-system 20 and is not under command and control of the second radio sub-system 10. However, the information comprised in the transferred in-device co-existence parameter 40_2 is used in an independent decision making process at the first radio sub-system 10. The first radio sub-system 10 is thus configured to control its use of radio resources in dependence upon the transferred in-device co-existence parameter 40_2.

The first radio sub-system 10 and the second radio sub-system 10 operate independently, and the information from transferred in-device co-existence parameters 40 is input to independent decision making processes at the first radio sub-system 10 and the second radio sub-system 10. The description of the first radio sub-system 10 and the second radio sub-system 20 as different sub-systems defines this independence.

Figure 1:
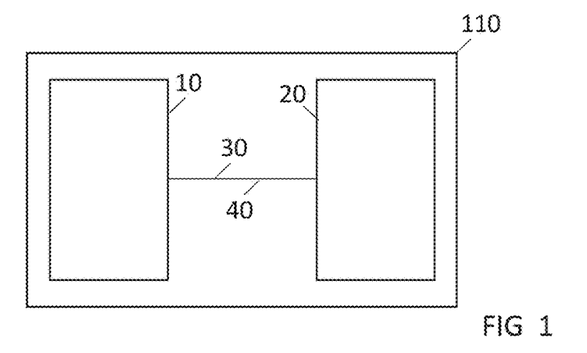
FIG. 1 shows an example of the subject matter described herein.

FIG. 1 illustrates an example of a user equipment 110.

The user equipment 110 comprises a first radio sub-system 10 configured to use a first radio access technology; and a second radio sub-system 20 configured to use a second radio access technology different to the first radio access technology.

The user equipment 110 also comprises a data interface 30 configured for transfer of parameters between the first radio sub-system 10 and the second radio sub-system 20.

The data interface 30 can be any suitable interface for transferring data between the first radio sub-system 10 and the second radio sub-system 20. Data can be transferred via the data interface 30 using any suitable protocol. Data can be transferred by push (e.g. unicast or broadcast) or pull. Data can be transferred unsolicited, via polling, or via periodic broadcasting.

In some but not necessarily all examples, the data interface 30 is a direct data interface without an intervening processor between the first radio sub-system 10 and the second radio sub-system 20. In some examples, the direct data interface 30 is a direct physical connection between first radio sub-system 10 and the second radio sub-system 20.

The user equipment 110 is configured to transfer an in-device co-existence relevant parameter 40_1, 40_2 between the first radio sub-system 10 and the second radio sub-system 20 to enable co-operation between the first radio sub-system 10 and the second radio sub-system 20 that avoids or reduces interference between the first radio sub-system 10 and the second radio sub-system 20.

The first radio sub-system 10 and the second radio sub-system 20 operate independently. However, the transferred in-device co-existence parameter 40 allows informed allocation of resources that mitigates interference between the first radio sub-system 10 and the second radio sub-system 20.

The user equipment 110 is configured to transfer an in-device co-existence relevant parameter 40_1 from the first radio sub-system 10 to the second radio sub-system 20 to enable co-operation between the first radio sub-system 10 and the second radio sub-system 20 that avoids or reduces interference between the first radio sub-system 10 and the second radio sub-system 20.

The user equipment 110 is configured to exchange in-device co-existence parameters 40_1, 40_2. The transfer of an in-device co-existence parameter 40 or in-device co-existence parameters 40 can be bi-directional. Bi-directional exchange can be performed as two independent unidirectional transfers or as contemporaneous unidirectional transfers that exchange contemporaneous information.

The transferred in-device co-existence parameter 40_1 at least indicates a radio resource and the second radio sub-system 20 is configured to enable, in dependence upon the transferred in-device co-existence parameter 40_1, co-operation between the first radio sub-system 10 and the second radio sub-system 20 that avoids or reduces interference between the first radio sub-system 10 and the second radio sub-system 20. The second radio sub-system 20 is configured to control its use of radio resources in dependence upon the transferred in-device co-existence parameter 40_1. The transferred in-device co-existence parameter 40_1 allows the second radio sub-system 20 to allocate radio resources that mitigate interference between the first radio sub-system 10 and the second radio sub-system 20. The second radio sub-system 20, however, operates independently of the first radio sub-system 10 and is not under command and control of the first radio sub-system 10. However, the information comprised in the transferred in-device co-existence parameter 40_1 is used in an independent decision-making process at the second radio sub-system 20. The second radio sub-system 20 is thus configured to control its use of radio resources in dependence upon the transferred in-device co-existence parameter 40_1.

The user equipment 110 is additionally configured to transfer an in-device co-existence relevant parameter 40_2 to the first radio sub-system 10 from the second radio sub-system 20 to enable co-operation between the first radio sub-system 10 and the second radio sub-system 20 that avoids or reduces interference between the first radio sub-system 10 and the second radio sub-system 20. The transferred in-device co-existence parameter 40_1 at least indicates a radio resource and the first radio sub-system 10 is configured to enable, in dependence upon the transferred in-device co-existence parameter 40_2, co-operation between the first radio sub-system 10 and the second radio sub-system 20 that avoids or reduces interference between the first radio sub-system 10 and the second radio sub-system 20.

The first radio sub-system 10 is configured to control its use of radio resources in dependence upon the transferred in-device co-existence parameter 40_2. The transferred in-device co-existence parameter 40_2 allows the first radio sub-system 10 to allocate resources that mitigate interference between the first radio sub-system 10 and the second radio sub-system 20. The first radio sub-system 10, however, operates independently of the second radio sub-system 20 and is not under command and control of the second radio sub-system 20. However, the information comprised in the transferred in-device co-existence parameter 40_2 is used in an independent decision making process at the first radio sub-system 10. The first radio sub-system 10 is thus configured to control its use of radio resources in dependence upon the transferred in-device co-existence parameter 40_2.

The first radio sub-system 10 and the second radio sub-system 10 operate independently, and the information from transferred in-device co-existence parameters 40 is input to independent decision making processes at first radio sub-system 10 and the second radio sub-system 10.

A Radio Access Technology (RAT) is the physical connection method for a radio-based communication (e.g. GSM, UMTS, 5G NR, Bluetooth, Wi-Fi, GNSS RX, ISM radio . . .

In at least some examples, the first radio access technology is for cellular radio telecommunications (e.g. GSM, UMTS, LTE, 5G NR, 6G . . . ). The first radio sub-system 10 is configured to operate in accordance with the telecommunication standards published for the appropriate cellular radio telecommunications.

In at least some examples, the second radio access technology is for non-cellular radio telecommunications (e.g. Bluetooth, Wi-Fi, GNSS RX, ISM radio . . . ). The second radio sub-system 20 is configured to operate in accordance with the standards published for the appropriate non-cellular system.

In at least some examples, the user equipment 110 is configured to transfer in-device co-existence relevant parameters 40 between the first radio sub-system 10 and the second radio sub-system 20 to enable co-operation between the first radio sub-system 10 and the second radio sub-system 20 that avoids or reduces interference, in a frequency domain and/or a time domain, between the first radio sub-system 10 and the second radio sub-system 20 caused by in-device co-existence.

In at least some examples an in-device co-existence relevant parameter 40 indicates a radio resource. A radio resource can be a resource in a time domain and/or a resource in a frequency domain.

In at least some examples an in-device co-existence relevant parameter 40 indicates use or intended use (reservation) of a radio resource by the radio sub-system that is causing the transfer of the in-device co-existence relevant parameter 40.

The in-device co-existence relevant parameter 40 can indicate a directionality of the radio resources e.g. transmission or reception. For example, in at least some examples the in-device co-existence relevant parameter 40 indicates whether a radio resource reservation is in respect of reception radio resources at the radio sub-system that is causing the transfer or in respect of transmit radio resources at the radio sub-system that is causing the transfer.

Examples of in-device co-existence relevant parameters 40 include, for example, frequency (UL/DL), timing like DRX/DTX, potentially determined interference levels, etc.

In some examples, an in-device co-existence relevant parameter 40 identifies the radio sub-system that is causing the transfer.

In some examples, an in-device co-existence relevant parameter 40 comprises radio measurements made by the radio sub-system that is causing the transfer or comprises information dependent upon measurements made by the radio sub-system that is causing the transfer.

In some examples, an in-device co-existence relevant parameter 40 relates to timing of transmissions and/or reception.

In some examples, an in-device co-existence relevant parameter 40 comprises a time schedule used by the radio sub-system that is causing the transfer or comprises information dependent upon a time schedule used by the radio sub-system that is causing the transfer. In some examples, an in-device co-existence relevant parameter 40 comprises a RX time schedule used for reception by the radio sub-system that is causing the transfer or comprises information dependent upon a RX time schedule used for reception by the radio sub-system that is causing the transfer. In some examples, an in-device co-existence relevant parameter 40 comprises a TX time schedule used for transmission by the radio sub-system that is causing the transfer or comprises information dependent upon a TX time schedule (e.g. a discontinuous transmission schedule) used for transmission by the radio sub-system that is causing the transfer.

An example of a RX time schedule is a discontinuous reception (DRX) schedule used by a radio sub-system configured to operate in a cellular telecommunications system. An example of a TX time schedule is a discontinuous transmission (DTX) schedule used by a radio sub-system configured to operate in a cellular telecommunications system.

An example of a RX/TX time schedule is a schedule used by a radio sub-system that is supporting a particular application. For example, some applications require radio resources periodically. For example, a speech codec may operate with a periodicity (frame rate) of 20 ms.

In some examples, an in-device co-existence relevant parameter 40 comprises information comprised within an information element transmitted by a radio sub-system configured to operate in a cellular telecommunications system to a network node of a cellular telecommunications system.

In some examples, an in-device co-existence relevant parameter 40 comprises information comprised within any of the 3GPP information elements: UEAssistanceInformation, idc-Assistance, or affectedCarrierFreqList (or its sub-element interferenceDirection) or affectedCarrierFreqCombList.

UEAssistanceInformation houses idc-Assistance with houses affectedCarrierFreqList and affectedCarrierFreqCombList. The affectedCarrierFreqList houses interference Direction.

The affectedCarrierFreqList indicates a list of NR carrier frequencies that are affected by in-device co-existence (IDC) problem. The affectedCarrierFreqCombList indicates a list of New Radio (NR) carrier frequencies combinations that are affected by IDC problems due to Inter-Modulation Distortion and harmonics from NR when configured with uplink (UL) carrier aggregation (CA). InterferenceDirection indicates the direction of IDC interference. Value nr indicates that only NR is victim of IDC interference, value other indicates that only another radio is victim of IDC interference and value both indicates that both NR and another radio are victims of IDC interference. The other radio refers to either the ISM radio or GNSS.

The transfer of in-device co-existence relevant parameters 40 between the first radio sub-system 10 and the second radio sub-system 20 enables (informs) coordination between in-device modules to avoid or reduce co-existence interference.

The coordination can, for example enable the sharing of radio resources in the time domain and/or the frequency domain.

A radio sub-system 10, 20 can be configured to avoid co-existence interference and/or avoid causing in-device co-existence interference. In some examples the radio sub-system 10, 20 is configured to avoid in-device co-existence interference in dependence upon a transferred (e.g. received) in-device co-existence relevant parameter and/or radio sub-system 10, 20 is configured to avoid causing in-device co-existence interference in dependence upon a transferred (e.g. received) in-device co-existence relevant parameter 40.

In at least some examples, one or both of first radio sub-system 10 and the second radio sub-system 20 are configured to control the use of radio resources (time domain and/or frequency domain) as a consequence of receiving the in-device co-existence relevant parameter 40.

In at least some examples, one or both of first radio sub-system 10 and the second radio sub-system 20 are configured to control the use of radio resources (time domain and/or frequency domain) in advance of or as a consequence of sending the in-device co-existence relevant parameter 40.

In at least some examples, one or both of first radio sub-system 10 and the second radio sub-system 20 are configured to avoid busyness and this avoidance can be dependent upon a received co-existence relevant parameter 40. For example, a clear channel assessment (CCA) operation or a listen before talk operation can be delayed or controlled in dependence upon a received co-existence relevant parameter 40.

In at least some examples, a cellular radio sub-system 10 is configured to communicate with a network node of the cellular radio telecommunications network in dependence upon a received co-existence relevant parameter 40. In some circumstances this may to be inform the network of a decision made at the cellular radio sub-system 10, for example, concerning radio resource allocation used at the cellular radio sub-system 10. In some circumstances this may to assist the network in making a decision concerning radio resource allocation at the cellular radio sub-system 10.

In at least some examples, where the first radio sub-system 10 is a cellular radio subsystem (e.g. a 3GPP transceiver module) and the second radio sub-system 20 is a Wi-Fi radio sub-system, the Wi-Fi radio sub-system 20 is configured to use clear channel assessment (CCA) in dependence upon received co-existence relevant parameters 40 indicating the discontinuous reception (DRX) and/or discontinuous transmission (DTX) patterns of the 3GPP system.

Figure 2:
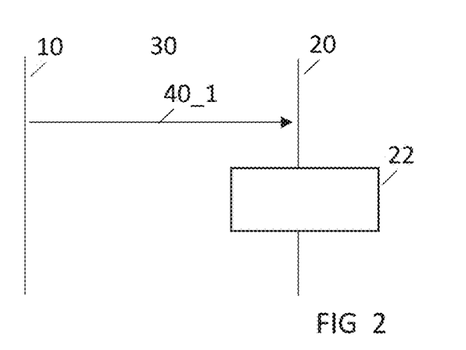
FIG. 2 shows another example of the subject matter described herein.

FIG. 2 illustrates any of the user equipment 110 as described above. In the example illustrated in FIG. 2, the first radio sub-system 10 is configured to use the data interface 30 for (direct or indirect) transfer, from the first radio sub-system 10 to the second radio sub-system 20, of at least a first in-device co-existence relevant parameter 40_1 configured to enable (inform) control at the second radio sub-system 20 avoiding or reducing interference between the first radio sub-system 10 and the second radio sub-system 20. The second radio sub-system 20 is configured to use the first in-device co-existence relevant parameter 40_1 transferred from the first radio sub-system 10 to the second radio sub-system 20 to avoid or reduce interference between the first radio sub-system 10 and the second radio sub-system 20.

The in-device co-existence parameter 40_1 at least indicates a radio resource (frequency resource and/or a time resource) and the second radio sub-system 20 is configured to control its use of radio resources (frequency resource and/or a time resource) in dependence upon the transferred in-device co-existence parameter 40_1.

The second radio sub-system 20 is configured 22 to use the at least one in-device co-existence relevant parameter 40_1 transferred from the first radio sub-system 10 to control allocation of transmission and/or reception resources associated with (e.g. used by) the second radio sub-system 20. The at least one in-device co-existence relevant parameter 40_1 transferred from the first radio sub-system 10 informs the second radio sub-system's control of allocation of transmission and/or reception resources (frequency domain resources and/or time domain resources) associated with (e.g. used by) the second radio sub-system 20.

Figure 3:
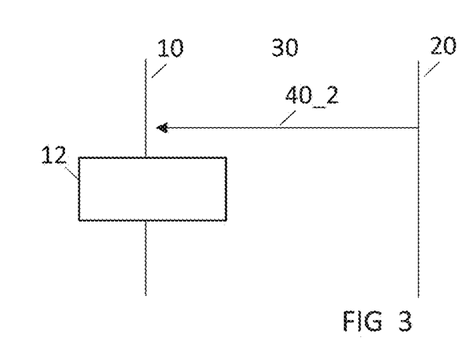
FIG. 3 shows another example of the subject matter described herein.

FIG. 3 illustrates any of the user equipment as described above. In the example illustrated in FIG. 3, the first second radio sub-system 10 is configured to use the data interface 30 for (direct or indirect) transfer, from the second radio sub-system 20 to the first radio sub-system 10, of at least a second in-device co-existence relevant parameter 40_2 configured to enable (inform) control at the first radio sub-system 10 avoiding or reducing interference between the first radio sub-system 10 and the second radio sub-system 20. The first radio sub-system 10 is configured to use the second in-device co-existence relevant parameter 40_2 transferred from the second radio sub-system 20 to the first radio sub-system 10 to avoid or reduce interference between the first radio sub-system 10 and the second radio sub-system 20.

The in-device co-existence parameter at least indicates a radio resource (frequency resource and/or a time resource) and the first radio sub-system 10 is configured to control its use of radio resources (frequency resource and/or a time resource) in dependence upon the transferred in-device co-existence parameter 40_2.

The first radio sub-system 10 is configured 12 to use the at least one in-device co-existence relevant parameter 40_2 transferred from the second radio sub-system 20 to control allocation of transmission and/or reception resources associated with (e.g. used by) the first radio sub-system 10. The at least one in-device co-existence relevant parameter 40_2 transferred from the second radio sub-system 20 informs the first radio sub-system's control of allocation of transmission and/or reception resources (frequency domain resources and/or time domain resources) associated with (e.g. used by) the first radio sub-system 10.

Referring to any of the FIGs, in some examples, the data interface 30 is a standardized interface that operates according to a standard protocol.

In some examples, the data interface is a command interface 30 that is in existence for configuring or querying a configuration of the sub-system but is re-purposed for transfer of in-device co-existence relevant parameters 40.

In some examples, the data interface 30 is configured for transfer of solicited responses and unsolicited responses between the first radio sub-system 10 and the second radio sub-system 20; wherein the in-device co-existence relevant parameters are transferred between the first radio sub-system 10 and the second radio sub-system 20 using unsolicited responses.

In some examples, the data interface 30 is configured for transfer of 3GPP AT messages between the first radio sub-system 10 and the second radio sub-system 20, where the in-device co-existence relevant parameters 40 are transferred between the first radio sub-system 10 and the second radio sub-system 20 using 3GPP AT messages. AT messages are defined in 3GPP TS 27.007 v18.2.0 (2023-03) "AT command set for User Equipment (UE) (Release 18)". This document specifies a profile of AT commands and recommends that this profile be used for controlling Mobile Termination (MT) functions and network services from a Terminal Equipment (TE) through Terminal Adaptor (TA). The command prefix+C is reserved for Digital Cellular in ITU-T Recommendation V.250. The document also has the syntax details used to construct extended commands. AT is two-character abbreviation for attention and is always used to start a command line to be sent from TE to TA.

In some examples, the unsolicited response comprises a response code plus additional information. In some examples the response code "IDC" is followed by a colon and a character string. In some examples the character string has a standard syntax comprising comma separated parameter values.

In some examples, the unsolicited response is according to a terminal entity (TE)-Terminal Adaptor (TA)-Mobile Termination (MT) interactive control standard.

Figure 4:
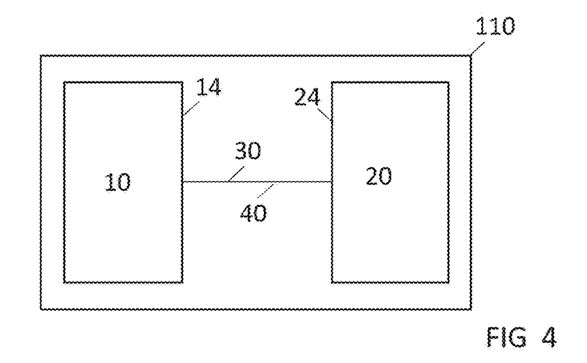
FIG. 4 shows another example of the subject matter described herein.

FIG. 4 illustrates an example of the user equipment 110. In this example, the first radio sub-system 10 is provided as a first user equipment module 14 and the second radio sub-system 10 is provided as a second user equipment module 24.

A module is a unit or apparatus that excludes certain parts/components that would be added by an end manufacturer or a user. Thus the first user equipment module 14 and the second user equipment module 24 have been added, for example at manufacture or later, to create the user equipment 110.

The first user equipment module 14 can therefore exist as an independent commercial product for integration with user equipment 110.

In at least some examples, the first user equipment module 14 for use in the user equipment 110 comprises:
a first radio sub-system 10 configured to use a first radio access technology;
a data interface 30 configured for transfer of parameters to the first radio sub-system 10 wherein the first radio sub-system 10 is configured to
use the data interface 30 for transfer of at least one in-device co-existence relevant parameter to the first radio sub-system 10; and
control use of radio resources by the first radio sub-system in dependence upon the transferred in-device co-existence parameter.

In at least some examples, the first user equipment module 14 for use in the user equipment 110 comprises:
a first radio sub-system 10 configured to use a first radio access technology;
a data interface 30 configured for transfer of parameters between the first radio sub-system 10 and a second radio sub-system 20 of the user equipment 110 wherein the first radio sub-system 10 is configured to
use the data interface 30 for transfer of at least one in-device co-existence relevant parameter to the first radio sub-system 10 from the second radio sub-system 20; and
in dependence upon the transferred at least one in-device co-existence relevant parameter, avoid, or reduce, interference between the first radio sub-system 10 and the second radio sub-system 20.

In at least some examples, the first radio sub-system 10 is configured to use the data interface 30 for transfer, from the first radio sub-system 10 to the second radio sub-system 20, of at least one in-device co-existence relevant parameter configured to enable (inform) control at the second radio sub-system 20 avoiding or reducing interference between the first radio sub-system 10 and the second radio sub-system 20.

The first user equipment module 14 can be configured to perform any of the functions described in other examples as performed by the first radio sub-system 10.

The second user equipment module 24 can also exist as an independent commercial product for integration with user equipment 110.

In at least some examples, the second user equipment module 24 for use in the user equipment 110 comprises:
a second radio sub-system 20 configured to use a second radio access technology;
a data interface 30 configured for transfer of parameters to the second radio sub-system wherein the second radio sub-system 20 is configured to
use the data interface 30 for transfer of at least one in-device co-existence relevant parameter to the second radio sub-system 20; and
control use of radio resources by the second radio sub-system in dependence upon the transferred in-device co-existence parameter.

In at least some examples, the second user equipment module 24 for use in a user equipment 110 comprises:
a first radio sub-system 10 configured to use a first radio access technology;
a data interface 30 configured for transfer of parameters between the first radio sub-system 10 and a second radio sub-system 20 of the user equipment 110 wherein the first radio sub-system 10 is configured to
use the data interface 30 for transfer of at least one in-device co-existence relevant parameter from the first radio sub-system 10 to the second radio sub-system 20 configured to enable (inform) control at the second radio sub-system 20 avoiding or reducing interference between the first radio sub-system 10 and the second radio sub-system 20.

In at least some examples, the second radio sub-system 20 is configured to use the use the data interface 30 for transfer, from the second radio sub-system 20 to the first radio sub-system 10, of at least one in-device co-existence relevant parameter; and in dependence on the transferred at least one in-device co-existence relevant parameter, avoid or reduce interference between the first radio sub-system 10 and the second radio sub-system 20.

The first user equipment module 14 can be configured to perform any of the functions described in other examples as performed by the first radio sub-system 10.

Figure 5:
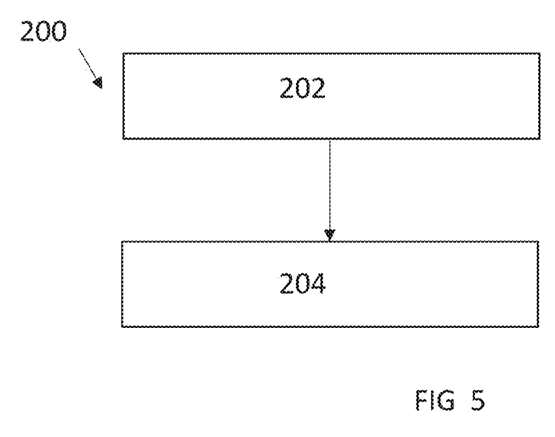
FIG. 5 shows another example of the subject matter described herein.

FIG. 5 illustrates an example of a method 200 for avoiding or reducing radio interference between a first radio sub-system 10 in an apparatus and a second radio sub-system 20 in the same apparatus.

At block 202, the method 200 comprises transferring at least one in-device co-existence relevant parameter from a first radio sub-system 10 to a second radio sub-system 20.

At block 204, the method 200 comprises, in dependence upon the transferred at least one in-device co-existence relevant parameter, avoiding, or reducing, radio interference between the first radio sub-system 10 and the second radio sub-system 20.

Figure 6:
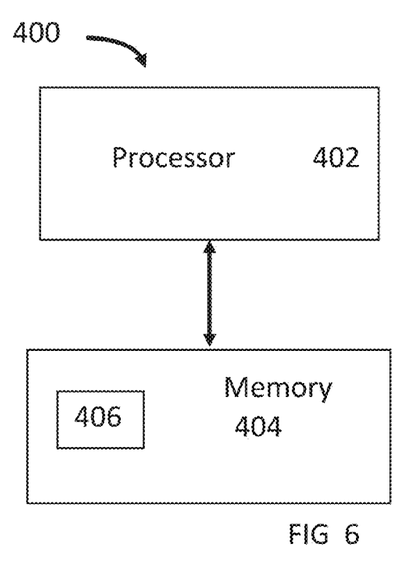
FIG. 6 shows another example of the subject matter described herein.

FIG. 6 illustrates an example of a controller 400 suitable for use in the user equipment or a radio sub-system 10, 20. Implementation of a controller 400 may be as controller circuitry. The controller 400 may be implemented in hardware alone, have certain aspects in software including firmware alone or can be a combination of hardware and software (including firmware).

As illustrated in FIG. 6 the controller 400 may be implemented using instructions that enable hardware functionality, for example, by using executable instructions of a computer program 406 in a general-purpose or special-purpose processor 402 that may be stored on a computer readable storage medium (disk, memory etc.) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the host when loaded into the processor 402. The computer program instructions, of the computer program 406, provide the logic and routines that enables the apparatus to perform the methods illustrated in the accompanying Figs. The processor 402 by reading the memory 404 is able to load and execute the computer program 406.

The host apparatus 100 comprises:
at least one processor 402; and
at least one memory 404 including computer program code, the at least one memory storing instructions that, when executed by the at least one processor 402, cause the apparatus 110 at least to:
transfer at least one in-device co-existence relevant parameter from a first radio sub-system to a second radio sub-system;
in dependence upon the transferred at least one in-device co-existence relevant parameter, avoiding or reducing interference between the first radio sub-system and the second radio sub-system.

Figure 7:
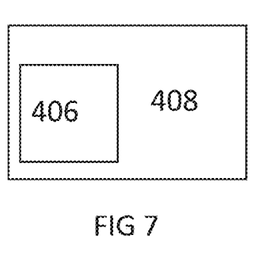
FIG. 7 shows another example of the subject matter described herein.

As illustrated in FIG. 7, the computer program 406 may arrive at the apparatus 110 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 406. The delivery mechanism may be a signal configured to reliably transfer the computer program 406. The apparatus may propagate or transmit the computer program 406 as a computer data signal.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

The following paragraphs describe some example use cases for mitigation of in-device co-existence interference. Other implementations are possible.

An interface 30 between the sub-systems 10, 20 allows the sub-systems 10, 20 to coordinate RX and TX activities between them.

This enables time synchronization between 3GPP modems and modems from other systems whereby interference (co-existence) problems can be avoided. Knowledge about Transmit "TX" and receive "RX" duration timing and pattern from both systems enable both modems to mitigate and avoid co-existence problems.

The interface 30 between the sub-systems 10, 20 of the device 110 allow the exchange of timing information 40 between the sub-systems 10, 20 to allow coordination of TX and RX activities, thereby at least minimizing the effects of in-device co-existence.

In some but not necessarily all examples, the device (user equipment 110) supports a new AT command, for example, which exchanges a transmit and/or receive occasion (and/or pattern) between a 3GPP modem 10 and further non-3GPP modems 10 implemented in the user equipment (UE) 110. When a modem receives the transmit and/or receive occasion (and/or pattern) of the other modems, the modem will align/coordinate its transmission/reception accordingly to avoid/mitigate interference for its own transmission/reception.

In some but not necessarily all examples, time multiplexing between modems 10, 20 is applied individually to avoid interference.

The exchange of timing information 40 is internal to the UE 110 between all/many modems 10, 20.

In some examples, one or each modem shares its transmit/receive occasions with the other modems of the UE 110 and then all modems determine their best/suitable transmit/receive occasion thereby reducing interference with the other modems.

If a UE modem detects a more suitable transmission/reception occasion, it notifies the network to reallocate better DTX/DRX resources.

These advantages may follow in at least some examples:
Better utilization of frequency spectrum as adjacent spectrum (3GPP/ISM) resources can be used more efficiently.

Higher potential throughput.

Enhanced quality of service for all RAT's.

Wi-Fi TX and 3GPP TX can be done simultaneously and potentially with partial overlap in order to free up time slots for reception at both systems.

RF front end filter requirements can be relaxed for an ISM modem as well as for the 3GPP modem which in turn enable lower power consumption and lower receive noise figure.

Alternatively cheaper filters can be used.

Improvement of algorithm that controls ISM band "listen before talk requirements" as busy Wi-Fi channel measurement due to high adjacent channel leakage ratio (ACLR) from a 3GPP transmitter is avoided.

Wi-Fi listen before talk requirements improved (53 uS after a clear channel is detected it is allowed to transmit for 10 ms, however much shorter Wi-Fi TX slots can also be used).

In some but not necessarily all examples, unsolicited AT commands, for example, can be used to provide the timing information 40 between the sub-systems 10, 20 (modems inside of a UE 110). In some but not necessarily all examples, the commands shall be added to 3GPP Technical Specification 27007.

Figure 8:
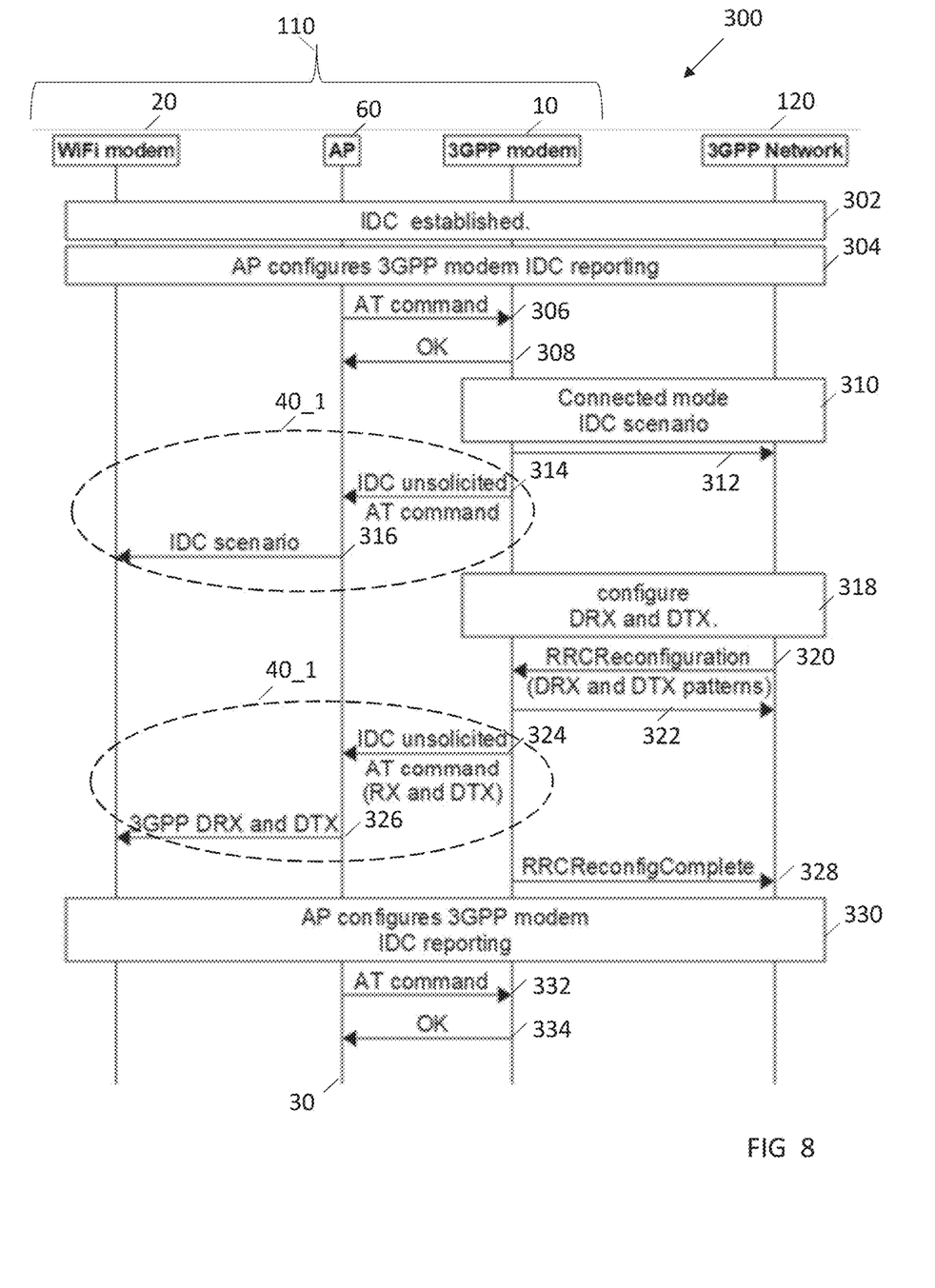
FIG. 8 shows another example of the subject matter described herein.

Referring to FIG. 8, there is illustrated an example of a user equipment 20 comprising a first radio sub-system 10 (3GPP modem) and a second radio sub-system 20 (Wi-Fi modem).

A data interface 30 is configured for transfer of parameters between the first radio sub-system 10 and the second radio sub-system 20.

The user equipment 110 is configured to transfer an in-device co-existence relevant parameter 40_1 from the first radio sub-system 10 to the second radio sub-system 20. The a first radio sub-system 10 is configured to send in-device co-existence relevant parameters 40 to the second radio sub-system 20, where the in-device co-existence parameter 40 at least indicates a radio resource, in a frequency domain and/or a time domain.

Also illustrated in the 3GPP network, represented by a network node 120.

At block 302, as an optional step, the in-device co-existence (IDC) use case has been established by evaluating the channels used by the 3GPP system, uplink and downlink individually.

At block 304, as an optional step, the application processor (AP) asks the 3GPP modem to report IDC parameters when they change, while in connected mode. It will then apply to all future connected mode sessions.

In this example, but not necessarily all examples, an AT command 306 configures the 3GPP modem 10 to send unsolicited AT commands on IDC parameters, whenever the user equipment 110 enters connected mode.

Enabling/disabling of the reporting can be optional, the reporting can be enabled by default. This command can be extended with a list of bands the 3GPP modem shall report IDC parameters on.

AT +CIDC=1,<bands> is a suggested AT command to enable unsolicited reporting of IDC relevant parameters.

The 3GPP modem 10 will acknowledge 308 the command 306 by the confirmatory response and from this point on report IDC parameters towards the AP 60.

At block 310, a Connected mode, IDC scenario is identified by evaluating channels configured for connected mode, uplink and downlink individually.

The 3GPP modem sends UE Assistance Information (IDC) 312. The UE Assistance Information (IDC) can provide IDC parameters to the network where they can then be used in network decision processes.

When a channel configuration is received, the configured channels can be used to establish whether an IDC scenario is becoming active, meaning, will there be interference between the 3GPP and the Wi-Fi systems. This is then indicated from the 3GPP system to the Application Processor, AP, system, which is also in control of the Wi-Fi system.

In some but not necessarily all examples, the 3GPP modem 10 sends 314 an indication of IDC scenario by using an unsolicited AT command e.g. AT +CIDC <UL channel><DLchannel>

The above indication towards the AP 60 will allow the AP 60 to inform 316 the Wi-Fi modem 20 using an Indication of the IDC scenario. An example could also be AT command; however, this may not be unsolicited because as the AP 60 is most likely the master towards the Wi-Fi modem 20.

In a further example, the network 120 can, at block 318, configure discontinuous reception DRX and discontinuous transmission DTX.

The network node 120 sends a RRCReconfiguration message 320 to the 3GPP modem for applying the DRX and DTX patterns.

The 3GPP modem 10 can send to the network node 120 UE Assistance Information (IDC).

If DRX and/DTX patterns are configured for the 3GPP system, the timing of this configuration, period, active time, idle time, time base, etc, can be indicated 324 towards the AP 60. The indication of DRX and DTX patterns can be achieved using an unsolicited AT command e.g. AT +CIDC <DRX pattern><DTX pattern>

The indication of DRX and DTX patterns can be communicated 326 to the Wi-Fi modem 20.

After the 3GPP modem sends a RRCReconfiguration-Complete message 328 to the network node 120.

As an optional step 330, the AP 60 asks the 3GPP modem 10 to stop reporting IDC parameters.

The 3GPP modem can be configured to disable sending unsolicited AT commands on IDC using an AT command e.g. AT+CIDC=0. The suggested command disables unsolicited reporting.

The 3GPP modem 10 will acknowledge 334 the disable command sent at step 330.

FIG. 8 illustrates the transfer of in-device co-existence relevant parameters 40 from the 3GPP mode 10 to the Wi-Fi modem 20. It will be appreciated that this is a specific example of the process previously described with reference to FIG. 2 above. In at least some examples, the transfer of in-device co-existence relevant parameters 40 is alternatively or additionally from the to 3GPP mode 10 to the Wi-Fi modem 20. It will be appreciated that this is a specific example of the process previously described with reference to FIG. 3 above.

In some examples the AP (application processor) 60 is optional. In at least some examples the AT commands issued by the first radio sub-system 10 (e.g. 3GPP modem) goes directly to the second radio sub-system 20 and an intervening application processor is not present.

For example, in a an internet of things user equipment, it may be desirable to use a direct interface 30 between the first radio sub-system 10 and the second radio sub-system 20. This avoids a required to have a controller for performing the application processor function.

References to 'computer-readable storage medium', 'computer program product', 'tangibly embodied computer program' etc. or a 'controller', 'computer', 'processor' etc.

should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

Figure 9:
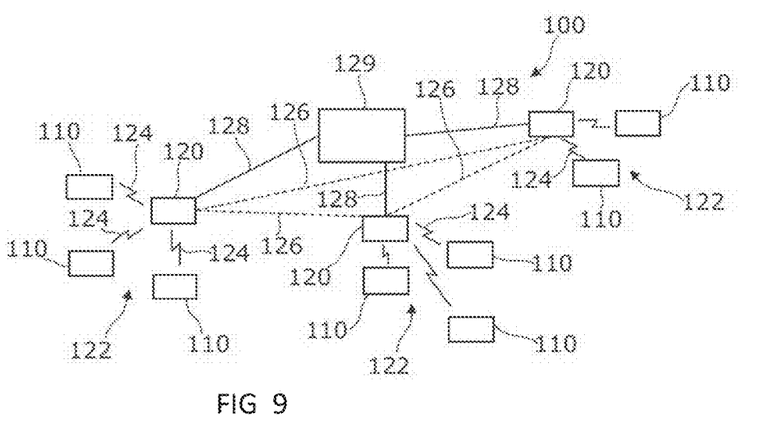
FIG. 9 shows another example of the subject matter described herein.

FIG. 9 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

A user equipment 110 comprises a mobile equipment. Where reference is made to user equipment that reference includes and encompasses, wherever possible, a reference to mobile equipment.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
 (i) a combination of analog and/or digital hardware circuit(s) with software/firmware and
 (ii) any portions of hardware processor(s) with software (including digital signal processor(s)), software, and memory or memories that work together to cause an apparatus, such as a mobile phone or server, to perform various functions and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the accompanying Figs may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above-described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The apparatus can be provided in an electronic device, for example, a mobile terminal, according to an example of the present disclosure. It should be understood, however, that a mobile terminal is merely illustrative of an electronic device that would benefit from examples of implementations of the present disclosure and, therefore, should not be taken to limit the scope of the present disclosure to the same. While in certain implementation examples, the apparatus can be provided in a mobile terminal, other types of electronic devices, such as, but not limited to: mobile communication devices, hand portable electronic devices, wearable computing devices, portable digital assistants (PDAs), pagers, mobile computers, desktop computers, televisions, gaming devices, laptop computers, cameras, video recorders, GPS devices and other types of electronic systems, can readily employ examples of the present disclosure. Furthermore, devices can readily employ examples of the present disclosure regardless of their intent to provide mobility. The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. A user equipment comprising:
a first radio sub-system configured to use a first radio access technology;
a second radio sub-system configured to use a second radio access technology different to the first radio access technology;
a data interface configured for transfer of parameters between the first radio sub-system and the second radio sub-system;
wherein the first radio sub-system is configured to send at least a first in-device co-existence relevant parameter to the second radio sub-system, wherein the first in-device co-existence parameter at least indicates a radio resource in a frequency domain and/or a time domain,
wherein the second radio sub-system is configured to use the first in-device co-existence relevant parameter sent from the first radio sub-system to avoid or reduce interference between the first radio sub-system and the second radio sub-system,
wherein the second radio sub-system is configured to control its use of at least radio resources in a frequency domain and a time domain in dependence upon the first in-device co-existence parameter,
wherein the second radio sub-system is configured to use the first in-device co-existence relevant parameter sent from the first radio sub-system to control allocation of transmission and reception resources, in a frequency domain and a time domain, associated with the second radio sub-system,
wherein the second radio sub-system is configured to use the data interface to send at least a second in-device co-existence relevant parameter to the first radio sub-system, wherein the second in-device co-existence parameter at least indicates a radio resource in a frequency domain and a time domain, wherein the first radio sub-system is configured to use the second in-device co-existence relevant parameter sent from the second radio sub-system to avoid or reduce interference between the first radio sub-system and the second radio sub-system, wherein the first radio sub-system is configured to control at least its use of radio resources in a frequency domain and a time domain in dependence upon the second in-device co-existence parameter, wherein the first radio sub-system is configured to use the second in-device co-existence relevant parameter transferred from the second radio sub-system to control allocation of transmission and reception resources, in a frequency domain and a time domain, associated with the first radio sub-system, wherein the data interface is configured for transfer of solicited responses and unsolicited responses between the first radio sub-system and the second radio sub-system;

wherein the first radio sub-system is configured to send the first in-device co-existence relevant parameters using an unsolicited response, wherein the data interface is configured for transfer of 3GPP AT messages between the first radio sub-system and the second radio sub-system and wherein the first radio sub-system is configured to send the first in-device co-existence relevant parameters using a 3GPP AT message, wherein the first radio sub-system is a cellular radio telecommunications sub-system and the second radio sub-system is a radio modem sub-system or wherein the second radio sub-system is a cellular radio telecommunications sub-system and the first radio sub-system is a radio modem sub-system, wherein the data interface is a direct data interface without an intervening processor between the first radio sub-system and the second radio sub-system, and the direct data interface is a direct physical connection between the first radio sub-system and the second radio sub-system, wherein the second radio sub-system is configured to use clear channel assessment (CCA) in dependence upon received co-existence relevant parameters indicating the discontinuous reception (DRX) and discontinuous transmission (DTX) patterns of the 3GPP system.

* * * * *